UNITED STATES PATENT OFFICE.

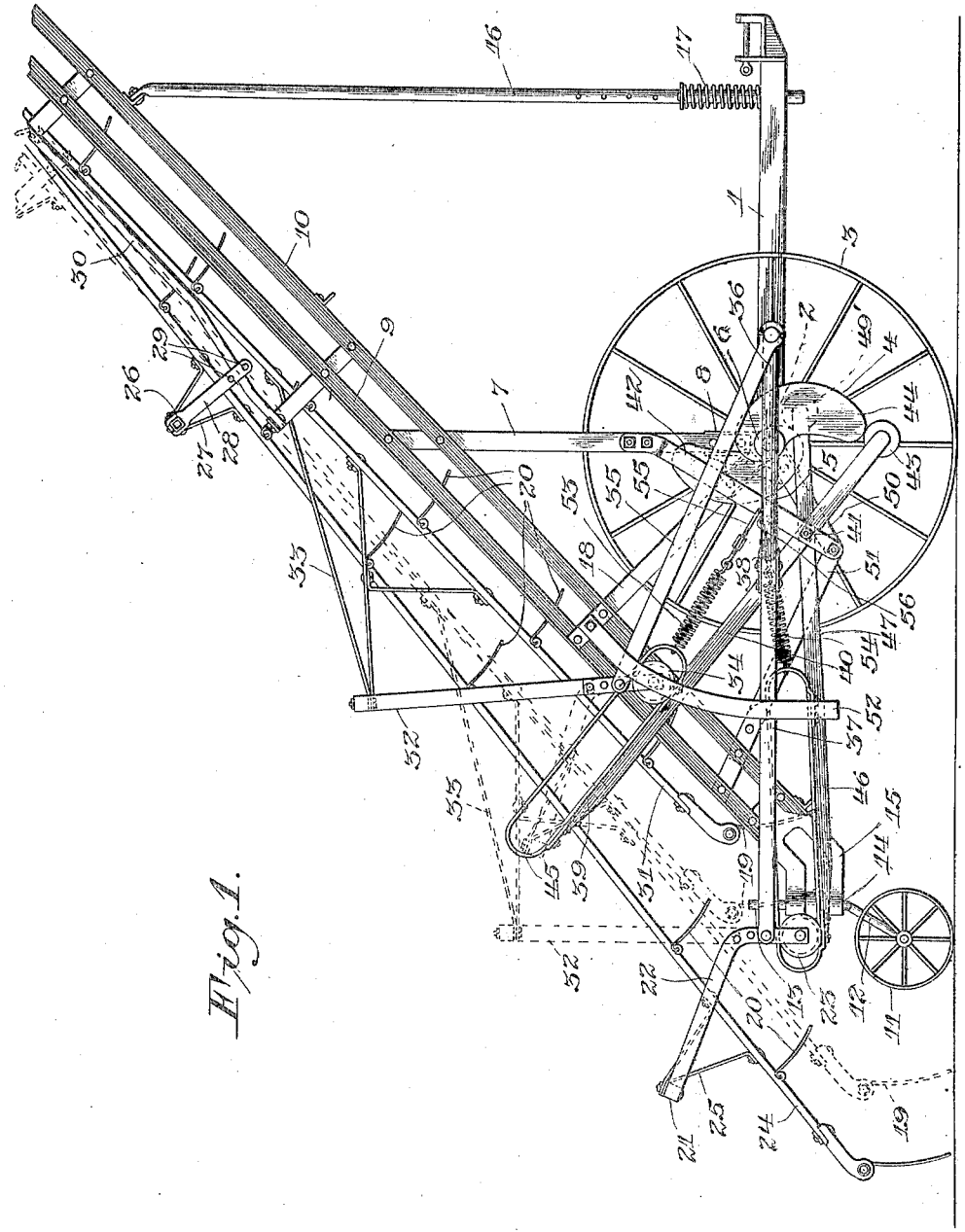

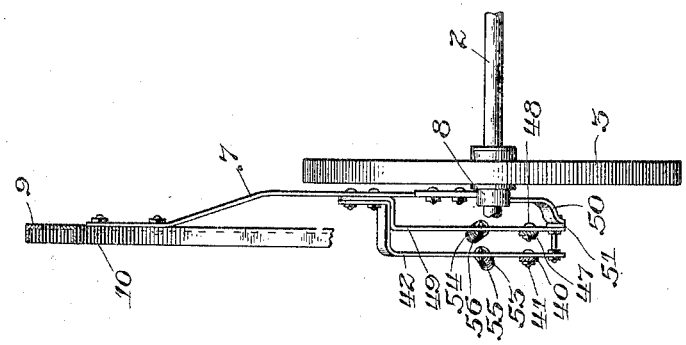
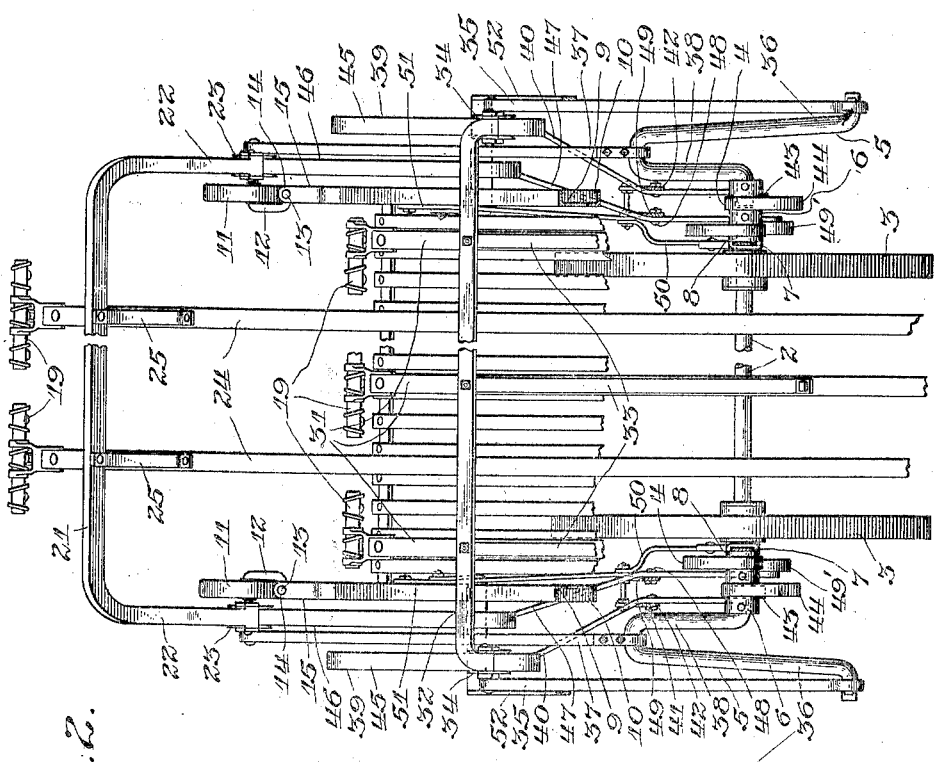

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

HAY-LOADER.

1,275,658.   Specification of Letters Patent.   Patented Aug. 13, 1918.

Application filed December 10, 1915. Serial No. 66,170.

*To all whom it may concern:*

Be it known that I, EDWARD W. BURGESS, a citizen of the United States, residing at Chicago, in the county of Cook and State of Illinois, have invented certain new and useful Improvements in Hay-Loaders, of which the following is a full, clear, and exact specification.

My invention relates to hay loaders of the walking rake type.

The objects of the invention are to improve loaders having means for controlling the orbital path of movement of the rake gangs, and means for counterbalancing the weight of the rake gangs as they are reciprocated in the operation of the machine.

These objects are attained by means of the mechanism embodied in the structure illustrated in the drawings, in which—

Figure 1 is a side elevation of a hay loader having my invention embodied in its construction;

Fig. 2 is a partial top plan view of Fig. 1; and

Fig. 3 is a detached vertical detail, partly in section, of part of Fig. 1.

Referring to the drawings, wherein the same reference numerals designate like parts throughout the several views, 1 represents part of the draft frame, 2 a rotatable axle having carrying and traction wheels 3 mounted thereon, 4 oppositely disposed wiper cams secured to opposite ends of the axle outside of the traction wheels, 5 double cranks secured to the hub members 6 of the double cams at opposite sides of the machine, and 7 vertically disposed frame members having their lower ends secured to axle bearing members 8 and their upper ends to upper and lower spaced frame bars 9 and 10, respectively, forming part of the upwardly and forwardly inclined elevator frame that is supported at its lower end by means of caster wheels 11 journaled upon arms 12, having vertically disposed stems 13 journaled in bearing members 14 integral with bracket members 15 secured to the lower ends of the frame bars 9 and 10. The upper end of the elevator frame is adjustably supported by means of a vertically disposed bar 16 connecting it yieldingly with the front end of the draft frame member 1 by means of a compression spring 17, and 18 represents a frame bar disposed at right angles with the bars 9 and 10, having its upper end secured to said bars and its lower end to the axle bearing member 8.

In common with this type of machine, there are two separate gangs of reciprocating rake bars, each provided with ground raking members 19 at their lower rear ends and pivoted carrying tines 20 spaced apart throughout their length. 21 represents a transversely disposed U-shaped yoke member having its side members 22 extending downward and forward, and 23 represents flanged rollers journaled upon their lower ends. The lower ends of the rake bars 24 of one gang are connected with the head of the yoke by means of bracket members 25, and their upper ends are connected with a transversely disposed bar 26 by means of bracket members 27, only one being shown, said bar being provided at its opposite ends with depending arms 28 having rollers 29 journaled upon their lower ends that engage with a longitudinally disposed track rail 30 carried by the frame of the elevator. The rake bars 31 of the remaining gang are connected with a yoke member 32, similar to the yoke 21, by means of bracket members 33, and 34 represents flanged rollers journaled upon the lower ends of its side members. The upper ends of the bars are supported and guided like those of the first named gang upon the track rail 30. The lower ends of the side members of the yoke 32 are pivotally connected with the rear ends of pitmen 35 having their front ends pivotally connected with the outside crank arms 36 of the double cranks 5 rotatable with the axle, and the side members 22 of the yoke 21 are connected in a like manner, by means of pitmen 37, with the remaining crank arms 38. The flanged rollers 34, carried by the yoke member 32, are adapted to travel upon track rails 39 having their front ends secured to inwardly and forwardly extending levers 40 that are pivotally mounted intermediate their ends upon studs 41 carried by the inclined frame members 42, having their upper ends secured to the vertical side frame members 7, the front ends of the levers having rollers 43 journaled thereon that travel upon the outside wiper cams 44 rotatable with the axle. 45 represents guard rails having their opposite ends secured to the track rail 39 and engaging with the upper side of the flanged rollers 34. The flanged rollers 23, carried by the yoke member 21, are likewise adapted to travel upon track rails 46, having their front ends secured to inwardly and forwardly extending levers 47 that are pivotally mounted intermediate their ends upon studs 48 carried by inclined supplemental frame members 49, having their upper ends secured to the vertical frame members 7 coincident with the frame members 42, the front ends of the levers having rollers $49^1$ journaled thereon and engaging with the complemental wiper cams. The lower ends of the frame members 42 and 49 are connected with bars 50 extending downward and rearward from the axle bearing member 8 and to the front ends of inclined bars 51, having their opposite ends secured to the side frame members 9 and 10 of the elevator. 52 represents curved guides having their upper front ends secured to the upper end of the diagonal frame member 18 and extending rearward and downward outside of the track rails, and are then turned inward and upward and have their opposite ends secured to the inclined frame bars 51, the function of the guides being to prevent a lateral swing of the rake gangs during the operation of the loader. 53 and 54 represent counterbalancing springs having their rear ends connected with the front end of the guard rails 45 and their front ends with link members 55 and 56 that are adjustably connected with the inclined frame members 42 and 49, respectively.

In operation, the axle 2 is rotated by the traction wheels 3, and the wiper cams 4 turn with it; the double cranks 5, through their pitman connection with the yokes 21 and 32, impart a reciprocating movement to the rake gangs and the wiper cams engage with the rollers 43 and $49^1$, and the levers 40 and 47 lift the track rails 39 and 46 in a manner to cause the ground raking members 19 to move in a horizontal path forward in their raking position during a greater part of the forward throw of the respective arms of the double cranks and then quickly lift them from the ground to deliver the hay to the receiving end of the elevator, and then control the path of their return to raking position, the counterbalancing springs 53 and 54 tensionally counterbalancing the return of the respective rake gangs to raking position and to assist in lifting them when moving forward.

Having shown and described one embodiment of my invention, I do not desire that it be confined closely to the specific details of the structure as illustrated, it being understood that changes may be made in the form, proportion and organization of its parts without departing from the spirit of the invention as indicated in the appended claims.

What I claim as my invention, and desire to secure by Letters Patent, is:

1. A hay loader including, in combination, an elevator frame, yoke members disposed transversely above said frame, separate gangs of rake bars carried by said yokes, rollers journaled upon the side members of said yokes, rotatable double cranks journaled upon said frame, cams adjacent to and rotatable with said cranks, pitmen connecting said gangs with said cranks, and rising and falling track rails controlled by said cams and upon which said rollers travel.

2. A hay loader including, in combination, an elevator frame, yoke members disposed transversely above said frame, separate gangs of rake bars carried by said yokes, rollers journaled upon the side members of said yokes, rotatable double cranks journaled upon said frame, cams rotatable with said cranks, pitmen connecting said gangs with said cranks, and track rails pivotally mounted upon said frame, said rollers traveling upon one end of said tracks and the opposite end of said tracks engaging with said cams.

3. A hay loader including, in combination, a rotatable axle, traction wheels mounted upon said axle, an inclined elevator frame carried by said axle, gangs of rake bars mounted upon said elevator frame in a manner permitting a reciprocatory movement thereof, yokes carrying the lower ends of said gangs of rake bars, rollers journaled upon said yokes, pivoted track rails carried by said frame and upon one end of which said rollers travel, double cranks upon the opposite ends of said axle, pitmen connecting said cranks with said yokes, and cams rotatable with said axle and engaging with the opposite ends of said track rails.

4. A hay loader including, in combination, an elevator frame, reciprocatory rake bars mounted above said frame, means for reciprocating said bars, and a spring mechanism connected to the bars and to said frame operable in a manner to balance a movement of said bars.

5. A hay loader including, in combination, an elevator frame, rising and falling reciprocatory rake bars mounted above said frame, means operable to lift and reciprocate said bars, and a spring mechanism operable to assist in lifting said bars and to balance a return movement thereof.

6. A hay loader including, in combination, a rotatable axle, traction wheels mounted upon said axle, an inclined elevator frame carried by said axle, gangs of rake bars mounted above said elevator frame in a manner permitting a rising and falling and reciprocatory movement thereof, yokes carrying the lower ends of said bars, rollers journaled upon said yokes, pivoted track rails carried by said frame, upon one end of which said rollers travel, double cranks upon opposite ends of said axle, pitmen connecting said cranks with said yokes, cams rotatable with said axle and engaging with the opposite ends of said track rails, and a spring mechanism operable to counterbalance a rising and falling movement of said track rails.

In testimony whereof I affix my signature.

EDWARD W. BURGESS.